United States Patent [19]

Barth et al.

[11] Patent Number: 4,910,661
[45] Date of Patent: Mar. 20, 1990

[54] METHOD AND APPARATUS FOR DECORATING CAKES AND OTHER FOODS

[75] Inventors: Edgar L. Barth, 4613 N.W. Normandy La., Kansas City, Mo. 64116; Ricardo Salas, Kansas City, Mo.; John J. Humbard, Pittsburg, Kans.

[73] Assignee: Edgar L. Barth, Kansas City, Mo.

[21] Appl. No.: 132,899

[22] Filed: Dec. 14, 1987

[51] Int. Cl.$^4$ .......................... A23G 3/02; A23G 3/28
[52] U.S. Cl. .............................. 364/167.01; 426/383
[58] Field of Search ...................... 364/167.01, 474.35, 364/474.28, 474.02, 474.26, 474.34, 188, 468, 470, 900, 200, 300; 355/3 R, 11, 153; 101/129, 126, 38 R; 426/383

[56] References Cited

U.S. PATENT DOCUMENTS

| | | | |
|---|---|---|---|
| 4,158,886 | 6/1979 | Gray, Jr. et al. | 364/900 |
| 4,469,022 | 9/1984 | Meador | 364/474.35 |
| 4,502,380 | 3/1985 | Meador | 101/129 |
| 4,531,292 | 7/1985 | Pasternak | 426/420 |
| 4,557,586 | 12/1985 | Hayashi et al. | 355/3 R |
| 4,670,271 | 6/1987 | Pasternak | 426/383 |
| 4,718,017 | 1/1988 | Hutton et al. | 364/470 |
| 4,742,556 | 5/1988 | Davis, Jr. et al. | 382/9 |

Primary Examiner—Allen MacDonald
Attorney, Agent, or Firm—Kokjer, Kircher, Bradley, Wharton, Bowman & Johnson

[57] ABSTRACT

An automatic decorating machine for applying flowable decorative materials to cakes and other food products as well as other articles. Live video images are captured by a video camera and are displayed on a video monitor. The video image can be combined with textual messages composed from alpha-numeric characters and with artwork which can either be composed contemporaneously on site or selected from previously prepared artwork selections. The video image, artwork and text can be edited and combined as desired for display on the monitor to provide a preview of the decorating pattern. The displayed pattern is reproduced on the cake by an X-Y table which moves liquid spray applicators and icing or gel dispensers over the cake and controls the application of food coloring and icing or gel in a manner to reproduce the selected pattern on the cake.

18 Claims, 5 Drawing Sheets

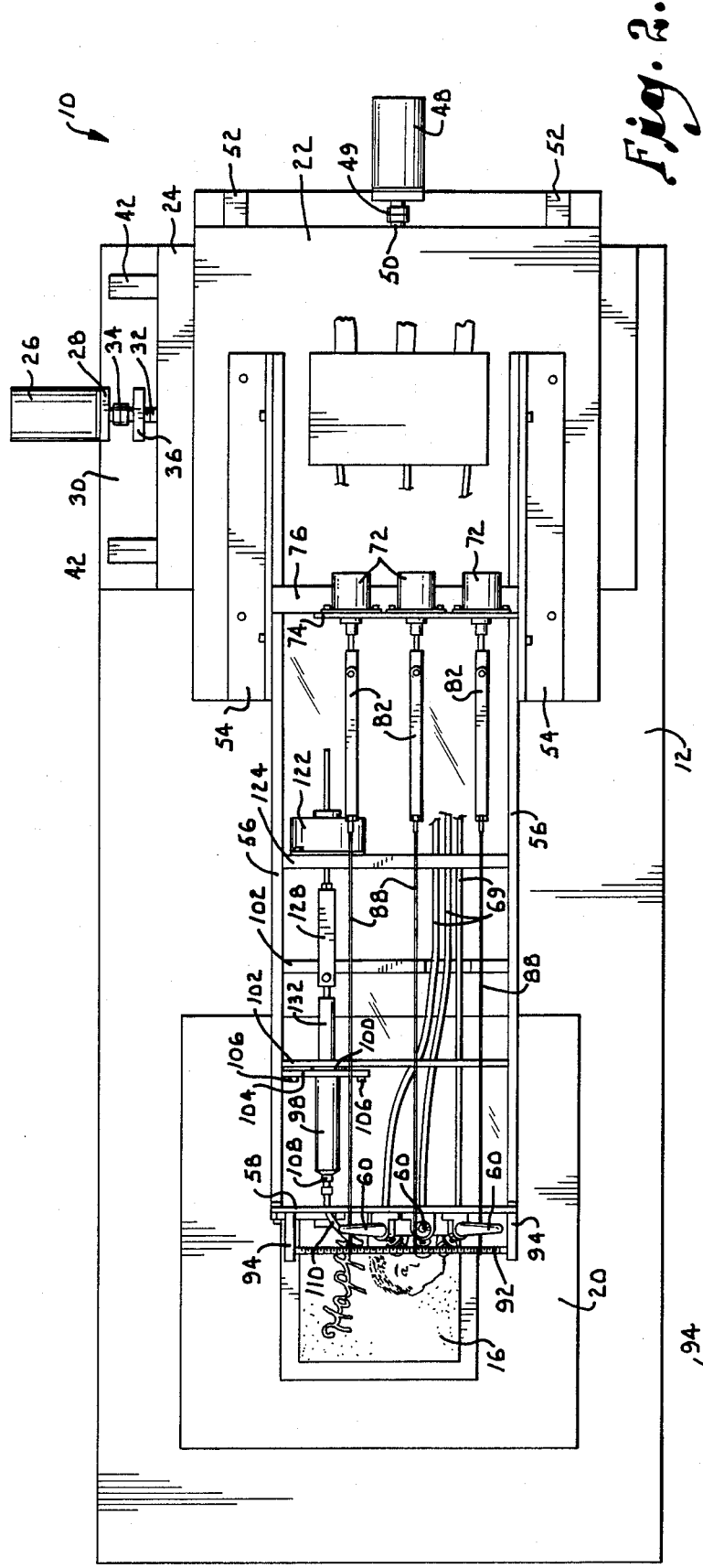
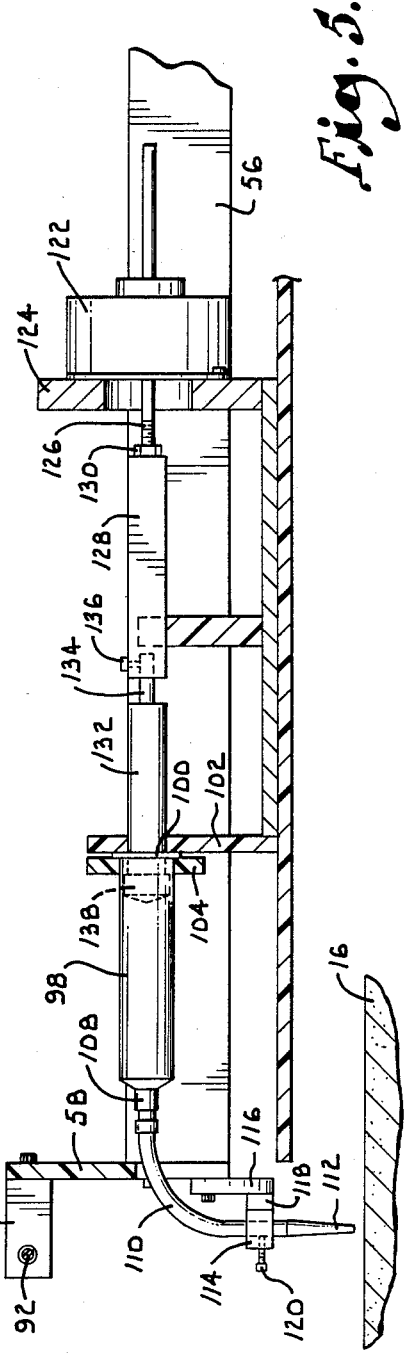

METHOD AND APPARATUS FOR DECORATING CAKES AND OTHER FOODS

BACKGROUND OF THE INVENTION

This invention relates generally to the decoration of cakes, cookies, hors d'oeuvres and other food items. More particularly, the invention is directed to a machine which applies semi-solid and/or liquid decorative materials in a pattern which may include an on-site video image and/or previously prepared materials in the form of drawings, fonts and other graphic and/or written material.

Various food items such as cakes, cookies, pastries and hors d'oeuvres are commonly decorated with icing, gel or liquid food coloring. For example, cakes are often decorated on their top surfaces with written messages and/or pictorial matter. At present, bakeries and the bakery departments of supermarkets employ decorators who manually apply the decorative materials to the cake. The labor costs involved in this conventional cake decoration procedure are substantial, in part because of the considerable amount of time that is required and in part because the cake decorators are relatively highly skilled and expensive personnel.

Another drawback with the manual cake decorating procedure is that the finished product is wholly dependent upon the skill of the cake decorator. As a consequence, the quality can vary widely depending upon the person doing the decorating and even among different cakes decorated by the same person. Even the most highly skilled and experienced cake decorators are unable to maintain consistently high quality and are limited in the types of designs and artwork they can use in the cake decoration.

Typically, a cake which is decorated according to the desires of a consumer must be ordered well in advance. Even then, the decorative choices are rather limited and the consumer must normally choose among a limited number of available patterns that are displayed in the bakery or bakery department. Therefore, the consumer is given little choice as to the decorative patterns that are possible, and he has little or no creative input as to the decoration of the cake or other food articles that are decorated.

SUMMARY OF THE INVENTION

The present invention is directed to an automatic machine which custom decorates cakes and other food items on site in a manner to maintain consistent quality. It is a particularly important feature of the invention that there is virtually no limit as to the design of the decorative pattern which is applied to the cake.

In accordance with the invention, live photographic images, previously or contemporaneously prepared artwork, and written messages can be composed as desired and accurately reproduced on cakes by icing, decorating gel and/or food coloring applied in a pattern to faithfully reproduce the decorative composition. The decorative pattern which is to be applied to the cake is composed on site and is displayed on a color video monitor to provide a preview of exactly how the decorated cake will ultimately appear.

It is an important aspect of the invention that a live photographic image can be displayed on the video monitor and captured on command. Alternatively, the camera can capture an image of a previously made photograph. In either case, the image which is captured is digitized and stored in computer memory so that it can be displayed on the monitor to determine its acceptability. If acceptable, the image can be recorded on a hard disk or other storage medium from which it can be retrieved and displayed again on the video monitor during the process of composing the decorative pattern.

The system of the present invention also provides a wide range of prepared artwork and/or pictures which are stored on disks or other storage media and can be called up on the video monitor and displayed alone or together with a photographic image. This allows the customer to select artwork that is compatible with the photographic image if desired. Drawings of animals, trees and other natural or man-made objects, cartoon characters, logos, outlines of states or countries, and other drawings may be made available. In addition, written messages in selected fonts can be composed and displayed with the photographic image and/or artwork. The photographic images, artwork, and written materials can be arranged as desired and can be displayed on the monitor in the desired arrangement to provide a preview of the pattern that will be reproduced on the cake or other article which is being decorated.

It is another important feature of the invention that artwork can be created on site and displayed on the video monitor. Editing capability is also provided for all of the images that are displayed on the video monitor, and the customer can thus select a custom tailored decorative pattern that includes photographic material and/or artwork (either previously or contemporaneously prepared) and/or written messages all composed and arranged on site with the active participation of the customer. Details such as colors, line widths, font style and image enhancements can also be manipulated as desired.

After the decorative pattern has been composed and displayed on the monitor, the machine can be activated to automatically reproduce the pattern on the cake. An X-Y table is moved systematically over the top of the cake and carries both spray applicators for applying liquid food coloring and dispensers for applying icing or decorating gel. These decorative materials are applied in amounts and at the locations commanded by the control system which uses the digitized image data to control application of the decorative materials in a pattern corresponding to the image which has been selected.

DESCRIPTION OF THE DRAWINGS

In the accompanying drawings which form a part of the specification and are to be read in conjunction therewith and in which like reference numerals are used to indicate like parts in the various views:

FIG. 2 is a top plan view of the machine shown in FIG. 1, with portions broken away for the sake of clarity;

FIG. 5 is a fragmentary sectional view taken generally along line 5—5 of FIG. 3 in the direction of the arrows;

DETAILED DESCRIPTION OF THE INVENTION

Figure 1:
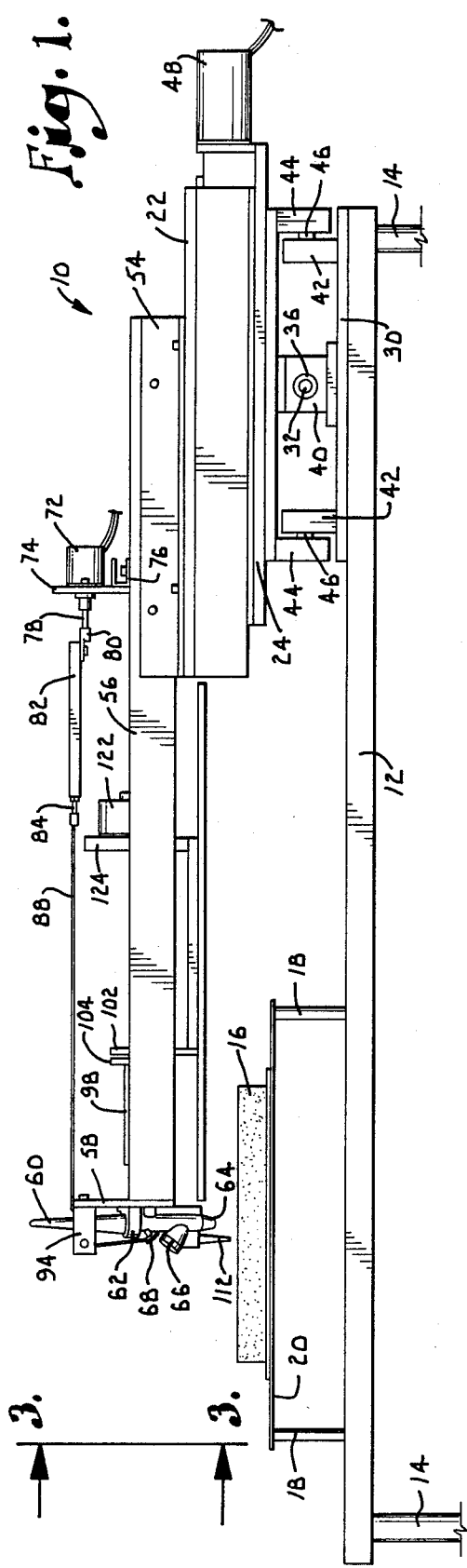
FIG. 1 is a fragmentary side elevational view of the mechanical portion of a cake decorating machine constructed according to a preferred embodiment of the present invention.

Referring now to the drawings in more detail and initially to FIGS. 1-5, numeral 10 generally designates a cake decorating machine constructed in accordance with a preferred embodiment of the present invention. The machine 10 is computer controlled in its operation and serves to apply decorative materials to food articles such as cakes, cookies, pastries and hors d'oeuvres. For purposes of illustration, the machine 10 will be described in connection with applying decorative materials to cakes.

The machine 10 has a frame which includes a horizontal table 12 supported on a plurality of upright legs 14. A cake which may be decorated is identified by numeral 16 and is supported on a portable stand having legs 18 which rest on top of table 12 and a horizontal platform 20 which is supported on the legs 18. The cake 16 is placed at a predetermined location on the platform 20.

As best shown in FIGS. 1 and 2, a pair of linearly movable tables which include an X table 22 and a Y table 24 are mounted on the stationary table 12. The X and Y table may be of a type which is commercially available. The Y table 24 is the lower table and is driven by an electric stepping motor 26. The motor 26 is secured to a small vertical plate 28 which is in turn secured to a horizontal mounting plate 30 located on top of the table 12 at one end thereof. The output shaft of motor 26 is secured to a threaded shaft 32 by a coupling 34. Bearings 36 support the threaded shaft 32 for rotation, and the shaft 32 has a threaded connection with a block 40 which depends from the underside of the Y table 24. Because of the threaded connection between shaft 32 and block 40, rotation of the shaft causes the Y table 24 to reciprocate back and forth linearly by a predetermined distance each time the motor 26 is stepped.

Table 24 is thus restricted to linear movement transversely of the table 12. A pair of guide bars 42 are secured to the mounting plate 30. Guides 44 project downwardly from table 24 at locations adjacent to the two guide bars 42. A pin or other guide element 46 extends from each guide 44 and fits in a channel formed in the corresponding guide bar 42, thus assisting in guiding the Y table 24 along its linear path.

The X table 22 is mounted on top of the Y table and is arranged to move linearly in the same manner as the Y table but in a direction perpendicular to the Y table movement. The X table 22 is driven by an electric stepping motor 48 which is mounted on the Y table. The motor 48 has its output shaft coupled at 49 with a threaded shaft 50 having a threaded connection with the X table 22. Consequently, stepping of motor 48 in opposite directions causes the X table 22 to move linearly in opposite directions by a predetermined distance with each step of the motor. The X table 22 has a guide arrangement similar to that of the Y table, and the guide arrangement includes a pair of guide bars 52. The X table 22 is restricted to linear movement lengthwise of table 12 or perpendicular to the axis of movement of the Y table 24.

Mounted on top of the X table 22 are a pair of parallel angle members 54. Secured to the angle members 54 and extending therefrom are a pair of long bars which form parallel arms 56 extending lengthwise above table 12. The opposite ends of the arms 56 are disposed near the location of the cake 16. Mounted on these ends of the arms 56 is a mounting plate 58 which carries devices which apply decorative materials to the cake.

Three liquid applicators 60 are secured to the outer side of plate 58 by mounting brackets 62. The applicators 60 are commercially available devices which are referred to in the industry as "air brushes". Each of the applicators 60 is used to spray colored liquid such as food coloring onto the cake 16 through a discharge nozzle 64 located at the bottom end of the applicator body. The liquid which is applied by each applicator 60 is received and carried in a funnel 66 on the side of the applicator body. Each applicator 60 includes a spring loaded needle valve (not shown) which normally closes nozzle 64 and prevents the liquid in funnel 66 from being discharged through the nozzle 64. However, a valve lever 68 on the side of each applicator body may be raised in order to unseat the needle valve to thus open the nozzle 64 and allow the liquid from funnel 66 to be discharged through the nozzle.

Figure 3:
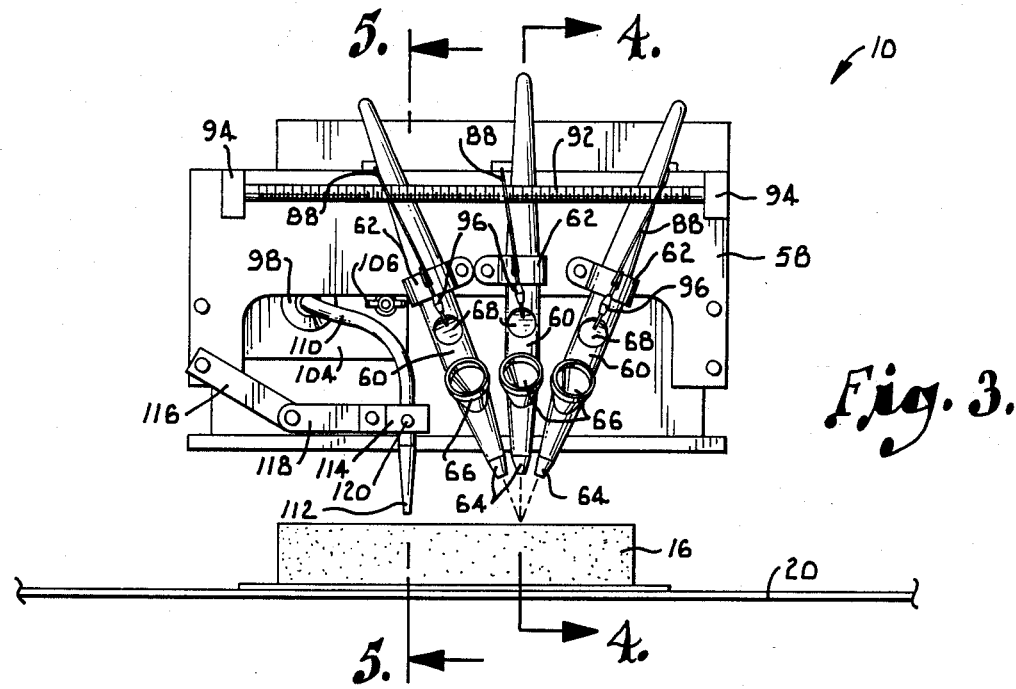
FIG. 3 is an end elevational view of the machine on an enlarged scale taken from the forward end.

With particular reference to FIG. 3, the three liquid applicators 60 are arranged with their nozzles 64 located adjacent to one another, with two of the applicators at an inclined angle such that all three of the nozzles 64 are aimed at the same location on the upper surface of the cake 16. It is contemplated that each applicator 60 will be provided with a different colored liquid so that the different colors can be mixed in controlled portions in order to vary the color of the liquid that is ultimately applied to the cake 16 for decorative purposes.

Figure 4:
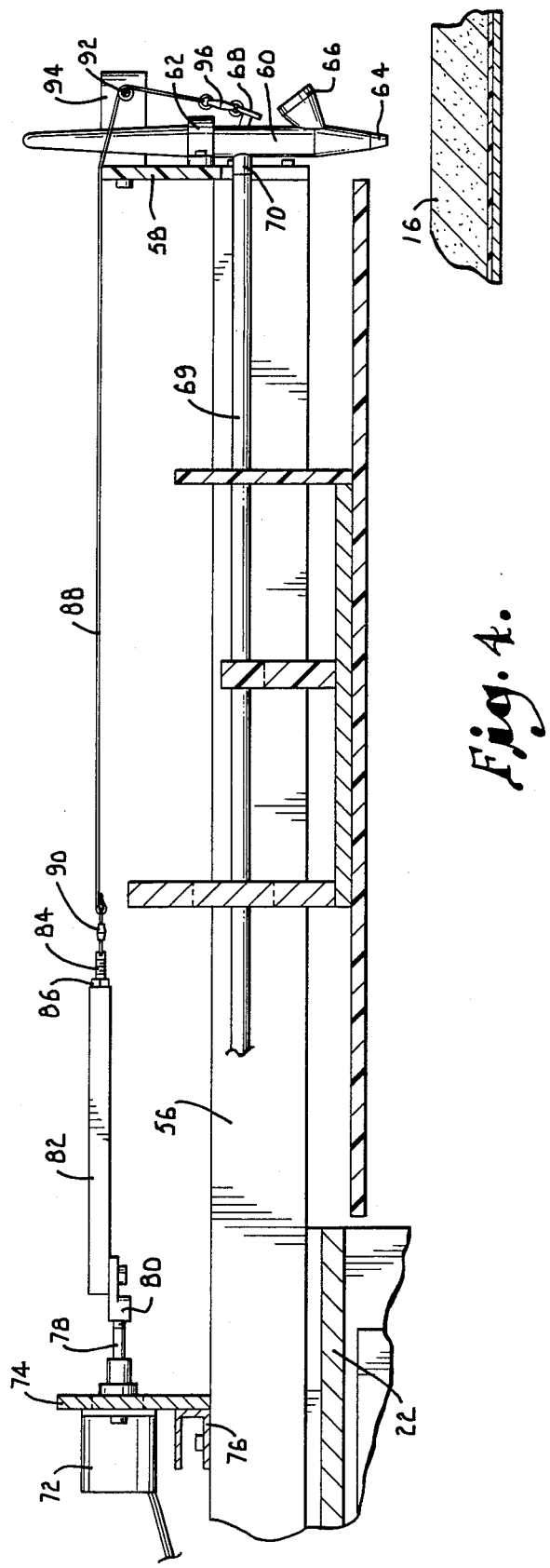
FIG. 4 is a fragmentary sectional view taken generally along line 4—4 of FIG. 3 in the direction of the arrows.

The spray applicators 60 are operated by air pressure supplied through pneumatic hoses 69. Each applicator has its own hose 69, and air under pressure is applied to the hoses by an air compressor or other suitable source (not shown). As best shown in FIG. 4, each hose 69 has its end slipped over a suitable connector 70 on the side of the corresponding applicator 60 at a location above the funnel 66. In this manner, air under pressure is applied to the interior of the applicator body so that immediately upon opening of the needle valve in the applicator body, the colored liquid is sprayed under pressure through the nozzle 64. It is noted that the nozzles provide small discharge outlets which focus the discharge spray precisely on the location at which the nozzle is aimed.

Each liquid applicator 60 is provided with an electric stepper motor 72 which controls operation of the valve lever 68. The three motors 72 are mounted side by side on a plate 74 secured to a U-shaped mounting bracket 76. The bracket 76 extends between and is secured to the two arms 56 at a location above the X table 22. As best shown in FIGS. 1 and 5, each motor 72 has an output shaft 78 which is extended or retracted by the motor, depending upon the direction the motor is commanded to operate. Each output shaft 78 is threaded into a sleeve 80, and each sleeve is secured to a bar 82. A threaded stud 84 extends from the opposite end of each bar 82 and has a threaded connection with the bar. A nut 86 is threaded onto each shaft 84 and may be tightened against the bar 82 in order to secure the stud 84 against rotation. The looped end of a flexible line 88 is secured to each stud 84 by a suitable connector 90. The three flexible lines 88 are drawn over the top edge of plate 58 and around a horizontal rod 92 which extends between a pair of lugs 94 projecting from plate 58. Each line 88 extends downwardly from rod 92 and is connected to the corresponding valve lever 68 by a suit-able connector 96.

The lines 88 are maintained under tension so that each valve lever 68 is raised when the corresponding motor 72 is stepped in a direction to retract its output shaft 78. The length of time and the physical extent to which the motor shaft is retracted determines the amount of liquid that is sprayed from the corresponding nozzle 64 With increasing shaft retraction, the valve is opened more fully such that more liquid is sprayed. When the motor shaft is again extended, the spring loaded needle valve within the applicator 60 is able to close the nozzle 64 in order to immediately cut off the spraying of liquid. The tension of each line 88 may be adjusted by loosening nut 86 and threading stud 84 into or out of bar 82 before again tightening the nut 86.

Icing, decorating gel or another semi-solid flowable material may also be applied to the cake 16. The icing or gel is contained within a tube 98. The tube 98 has an enlarged flange 100 on its base end which is fitted against a vertical plate 102 extending between the arms 56. The flange 100 is clamped between plate 102 and a smaller plate 104 which is removably clamped against the flange by releaseable fasteners 106 which may be bolts and wing nuts. The fasteners 106 may be removed to release plate 104 from plate 102, thus permitting tube 98 to be removed and re placed with another tube when the tube contents have been depleted.

On the end opposite flange 100, tube 98 has an outlet 108 provided with a downwardly and inwardly curved hose 110. Hose 110 terminates in a tapered discharge nozzle 112 which discharges the icing or gel in a thin bead. As best shown in FIG. 3, hose 110 fits closely through a collar 114 which is carried on the end of an adjustable linkage formed by a pair of pivotally connected links 116 and 118. This linkage can be adjusted to raise and lower the nozzle 112 and to adjust its position transversely of the table 12. A set screw 120 is threaded through block 114 and may be tightened against hose 110 at a location adjacent the nozzle 112 to fix the nozzle in position on the linkage.

The dispensing of the contents of tube 98 is controlled by a stepper motor 122 which is mounted on a plate 124 extending between the arms 56. Motor 122 has an output shaft 126 which is threaded and secured to a bar 128 by a nut 130. The bar 128 is supported for linear sliding movement on a notched plate 130. A plunger 132 has a base end from which a rod 134 extends into the end of bar 128. A set screw 136 may be tightened to secure the rod 134 to bar 128.

The plunger 132 extends through plates 102 and 104 into the base end of the dispensing tube 98. A piston 138 carried on the end of plunger 132 fits closely within tube 98 and acts to dispense the material contained within the tube when the plunger is advanced. Each time motor 122 is stepped in a direction to extend bar 128, the plunger 138 is advanced a predetermined incremental distance into the tube 98, thus forcing an incremental amount of material out of the nozzle 112. The amount of material that is dispensed depends upon the distance the plunger 138 is advanced into the tube.

Figure 6:
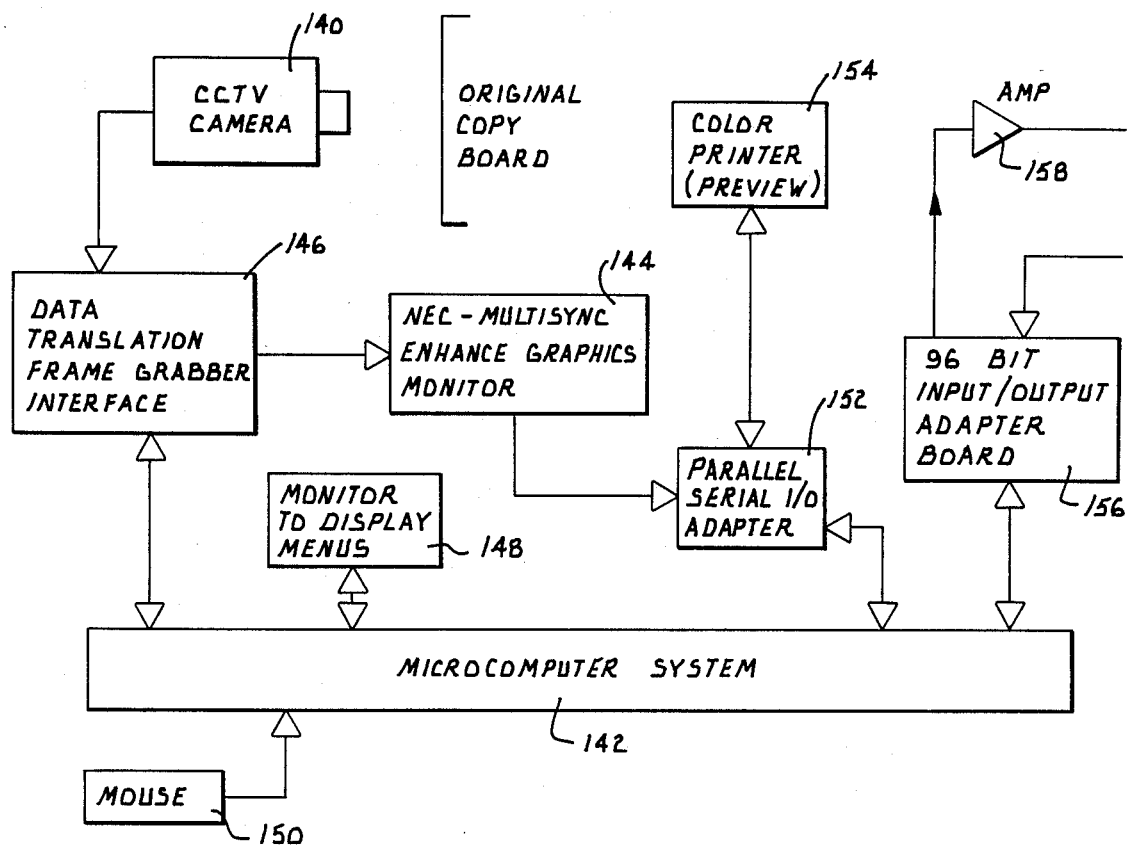
FIG. 6 is a functional block diagram of the control system which controls operation of the machine.

The X and Y table motors 48 and 26, the spray applicator motors 72 and the gel dispensing motor 122 are controlled by the microcomputer based control system shown in block diagram form in FIG. 6. In accordance with the present invention, a video camera 140 may be used to provide a live photographic image which is processed in the form of current industry standard RS-170 B video. Upon command from a microcomputer system 142, the live image currently provided by the camera 140 and displayed on a color video monitor 144 may be captured by a frame grabber circuit 146. The frame grabber electronically captures the live image currently displayed by the camera and converts it into an array of numbers which are entered into the memory of the microcomputer 142. The frame grabber digitizes the video signal from the camera at a rate of 1 frame of video information each 1/30 second. When so commanded by the software and the microcomputer 142, the frame grabber 146 freezes the current image and ceases conversion of additional video information input. The image captured by the frame grabber is held in a dual ported memory which may be used either by the frame grabber or the host microcomputer 142. Block 146 also provides an interface between the camera 140 and the monitor 144. Accordingly, the monitor 144 can either display the current image captured by the camera or the image that the frame grabber 146 has been commanded to capture and display. Each video frame is digitized by the frame grabber circuitry into a 256×240 pixel array, with each pixel having 64 shades of gray ranging between white and black.

Under software control, the microcomputer 142 can read the digitized picture from the frame grabber dual ported memory, and the picture can then be stored on a hard disk or another storage medium. In a preferred form of the invention, the microcomputer system 142 is an XT class system which can store the 61 KB image on a hard disk by simply reading the contents of the frame grabber buffer and writing that data on the hard disk. At a later time, the image can be read from the hard disk, placed back into the frame buffer on the frame grabber block 146 and displayed on the monitor 144.

In this manner, the camera 140 can be used to provide an on site photographic image which may be either a live image or an image captured by the camera from a previously prepared photograph. The image is displayed on the monitor 144, and the customer or operator of the system can "freeze" the image in order to capture it and store it for further use. In addition, previously prepared and stored photographic or artistic materials can be called up and displayed on the video monitor 144. For example, previously captured pictorial images which are stored on a hard disk can be called up and displayed on the monitor, as can previously prepared art work which has been stored on a disk or other file medium. Alpha numeric characters in a number of different fonts can also be stored on disks or other file media and called up and displayed on the monitor 144 so that the desired font can be selected if writing is to be included on the cake decoration.

A second monitor 148 may be used to provide a display of the various available menus that will subsequently be discussed. In addition, the system includes a hand held mouse 150 which may be used to provide a variety of functions. For example, in the drawing mode of operation, the mouse can be applied to the monitor 144 and manipulated along the monitor screen to prepare on site drawings or other art work.

The graphic information which is displayed on the monitor 144 is made available to the microcomputer 142 through an in/out adapter block 152. In addition, a printer 154 may be connected with the adapter block 152 so that, upon command, a permanent printed copy of the image which is displayed on the monitor 144 can be prepared.

Commands to the motors are applied from the microcomputer 142 to the motors through an input/output interface block 156. Each of the motors 26, 48, 72 and 122 is driven by the input/output interface 156 through a motor drive amplifier 158. Preferably, there are 24 electrical lines connecting the interface 156 with the motors. There are six motors, each having four phases so that the 24 lines can serve each phase of each motor. Each line is provided with one of the drive amplifiers 158.

Figure 7:
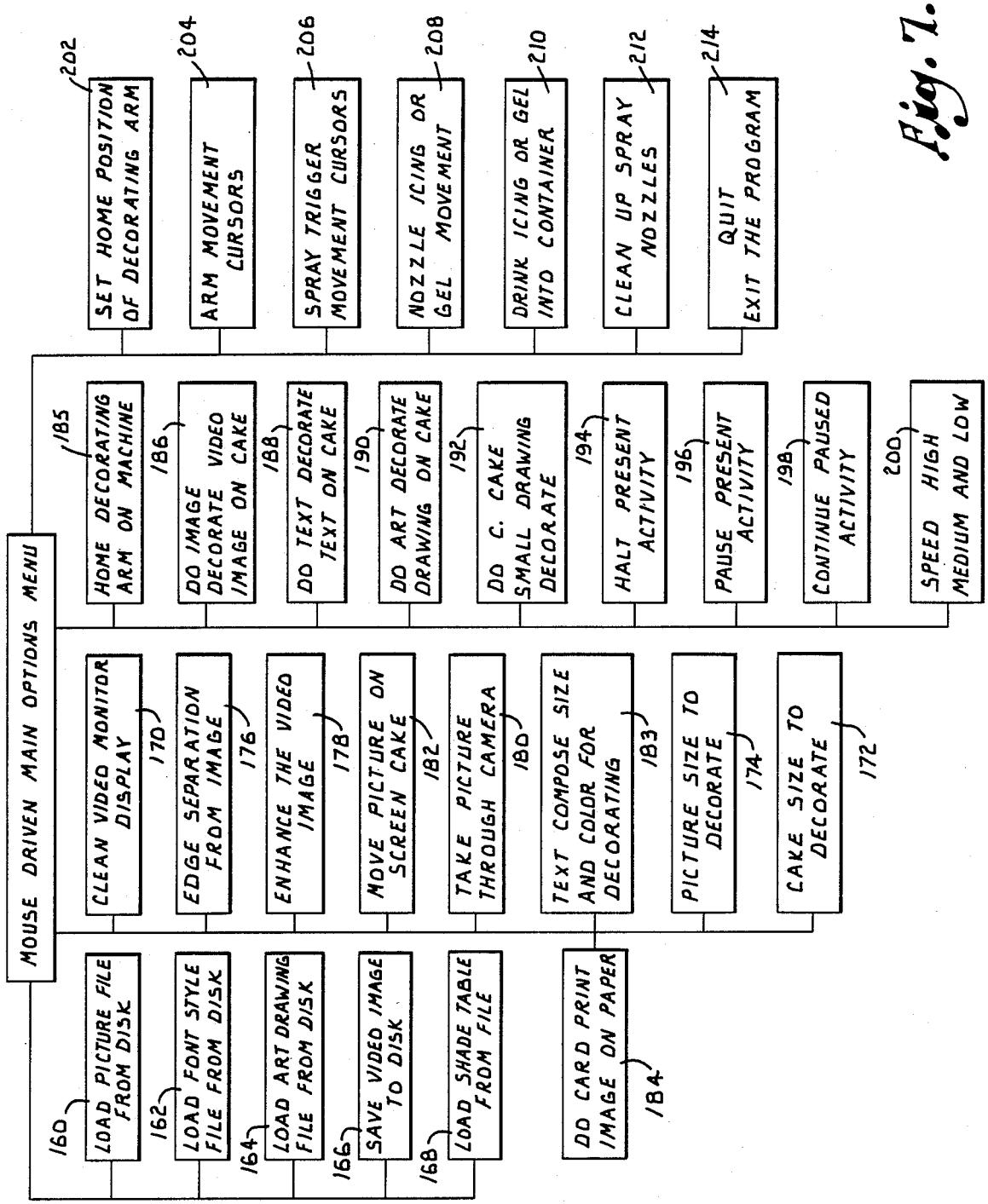
FIG. 7 is a flow diagram of the operation of the control system.

FIG. 7 shows diagrammatically a flow diagram for the functions that are controlled by the mouse 150. A load block 160 permits a picture file from a hard disk to be loaded and displayed on the color monitor 144. A selected font style stored on a disk may similarly be loaded and displayed by the load font block 162. An art file, either previously or contemporaneously prepared, may be loaded from its storage disk and displayed on the video monitor via block 164. The save block 166 permits a photographic image captured by the camera 140 to be saved by writing it on a hard disk or other storage medium. The load shade block 168 permits the shading of the image to be selected.

Block 170 permits the image on the color monitor to be cleaned. The size of the cake which is to be displayed on the monitor may be selected in block 172, while the picture size may likewise be selected by block 174. The edge separation block 176 permits the background of a photographic image to be erased, (but only if the image has a sharply defined outline and a relatively light background).

The enhance block 178 enhances the video image. The take picture block 180 is used to focus an image on the video monitor and "freeze" or capture it by depressing a button on the mouse. The move picture block 182 permits the image to be moved to whatever position is desired on the cake image which is displayed on the monitor. This can be done by depressing the button on the mouse and moving it on the monitor screen to the proper position desired for the image. The text block 183 allows the user to compose from alpha-numeric characters up to six lines of text which are to be reproduced on the cake. The size of the alpha numeric characters can be selected in block 183, and the color of the letters and numbers can likewise be selected. In addition, the position of the text on the cake can be adjusted by depressing the button on the mouse and moving the mouse to the proper position on the video monitor. Likewise, the text block 183 allows the user to select whether or not icing or gel is to be dispensed on the font. Normally, a liquid spray of the proper color is selected, and clear gel is overlaid on the spray so that the color of the liquid shows through the gel and the gel appears to be whatever color has been selected for the spray. The do card print block 184 is used to provide a permanent copy of the displayed decorated pattern by printing it on paper.

The home block 185 moves the XY table such that the support arms 56 are moved to the "home" position. The do image block 186 causes the XY table mechanism to scan the upper surface of the cake and apply the decorative materials in a pattern to reproduce the video image which is displayed on the video monitor. The do text block 188 similarly causes the machine to apply the decorative material in a pattern to reproduce the textual material that has been selected. The do art block 190 commands that whatever art work has been selected be reproduced on the cake by applying the decorative material in a pattern to reproduce the selected art work. The do C. cake block 192 reduces the size of the drawing which is reproduced on the cake. The halt block 194 permits the user to stop the decorating process. The pause block 196 permits the decorating activity to be temporarily paused, after which it can be continued through the continue block 198. The speed block 200 permits selection of the speed at which the decoration is carried out. Selection of the speed can be made among high, medium and low speeds.

The set home block 202 sets the home position of the applicator devices. This is accomplished by the arm movement cursors block 204. The spray trigger cursors block 206 allows the home position to be set for the air brush valve lever 68. The nozzle movement block 208 allows the home position of the plunger 132 to be set. Block 210 provides the option of backing the plunger 132 off in order to suck gel or icing back into the container. The clean up block 212 opens the air brush valve levers 68 for cleaning of the air brushes. Finally, the quit block 214 exits the program.

Figure 8:
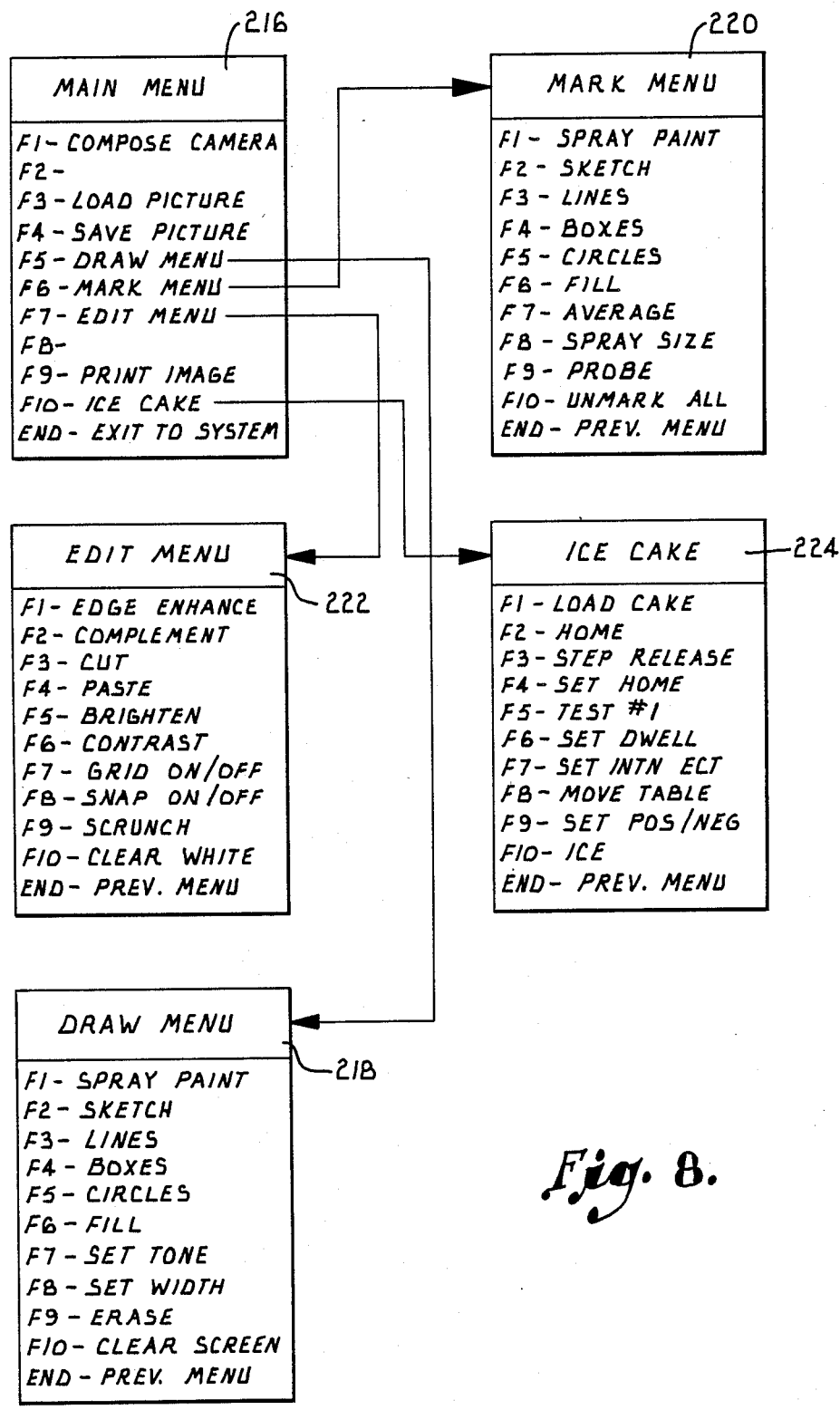
FIG. 8 is a diagrammatic representation of the menus that are available for controlling the operation of the machine.

FIG. 8 depicts diagrammatically the research menus that are provided. The main menu 216 allows the selection of functions which have previously been described and also allows the other menus to be selected. The draw menu 218 is entered in the event that can temporaneously prepared drawings are to be made by using the mouse. The mark menu 220 permits the user to flag selected elements of the picture by applying thereto lines, boxes, circles and the like. The edit menu 222 provides the capability of editing whatever image is displayed on the video monitor. Finally, the ice cake menu 224 permits special effects to be selected during the actual application of icing and/or liquid to the cake. The "ice" selection on the ice cake menu 224 performs the decorating of the cake or pastry using the digital data from the image that is displayed on the video monitor, along with the pitch and other special effects which are selected on the ice cake menu.

In operation of the machine, a customer who desires to have a custom tailored decoration applied to the cake 16 can select a video image which is provided by the camera 140. The image may be a live photographic image of the customer or an image taken by camera 140 from a previously prepared photograph of another person, for example. The image which is taken by the camera 140 can be frozen upon command by the frame grabber block 146 and displayed on the monitor 144 to determine its acceptability. If acceptable, the captured image can be stored on a hard disk.

The customer can also select from a file of previously prepared artwork which can likewise be displayed on the video monitor to determine its acceptability. Alternatively or in addition, the customer can add selectively to the artwork, as by adding shading or minor details. A written message can likewise be composed by the customer from the available alpha numeric characters and can be displayed on the video monitor 144.

When the photographic image, artwork, and written materials have been composed, they are displayed together on the video monitor at selected locations within a rectangular outline on the monitor representative of the cake. This permits the customer to preview how the decorated cake will ultimately appear. The various images can be positioned as desired on the cake relative to one another, and their size can be varied as desired. The desired colors and presence or absence of gel or icing can also be selected as to the text.

When the image has been selected and composed in the foregoing manner and has been processed if necessary until it is in the form desired by the customer, as depicted in the display on the video monitor 144, a printed copy of the image on the monitor can be obtained by activating the printer in block 154. Blocks 186, 188 and 190 are then used to instruct the microcomputer 142 to reproduce the displayed image by suitably applying the decorative material to the upper surface of the cake 16.

The microcomputer 142 uses the digitized image data to command application of the decorative materials in a pattern to reproduce the displayed image. Preferably, the X and Y motors 48 and 26 are sequentially stepped in a manner to scan the upper surface of the cake with the applicator devices. Preferably, the spray applicators 60 are first scanned across the part of the cake which is to be decorated by moving among the pixels in a predetermined sequence. The three applicators 60 are controlled by their motors 72 in a manner to apply the proper quantity and color of liquid to the pixels in a pattern necessary to reproduce the video image. After the cake has been sprayed by the liquid applicators 60, the icing or gel dispenser nozzle 112 is scanned in the same pattern over the upper surface of the cake. Its motor 122 is controlled by the computer such that the proper quantity of icing or gel is dispensed at the locations necessary to achieve the selected decorative pattern. Previously prepared artwork images are reproduced on the cake surface by applying lines of colors of spray (or gel or icing) from one X-Y point to another. Another dot to dot method is the application pattern is one in which each dot represents one pixel on the video screen.

In the foregoing manner, a customer is able to actively participate in selecting the parts of the custom tailored decoration on site, both as to photographic images and the artwork and written material, and the decoration which is composed is accurately and faithfully reproduced by the decorative materials which are applied to the cake. In addition to the enhanced accuracy and flexi-bility provided by the machine of the present invention, it also operates to decorate cakes and other food articles much faster than has been possible in the past. Moreover, the customer has creative input, both as to how the various available decorative components are arranged and as to the artistic content of each component. For example, the customer can create his own artwork or camera images and can compose his own text, as well as exercising judgement as to what font style to use, what prepared artwork is used, etc.

The artwork is composed by arranging colored lines of varying size and thickness and dots of various sizes into the desired pattern. Upon completion of a drawing, the drawing information is stored in an individual file on a disk or other storage medium. The drawing is stored in a format that can be read by the main decorating program. This allows the artwork to be previewed on the monitor before initiating the "decorate" command. Upon command, the machine decorates the surface of the cake in the order the image was originally created by the artist.

Although the operation of the machine has been described in connection with the decoration of a cake, it is pointed out that the machine is equally well suited to decorate other food articles such as pastries, cookies and hors d'oeuvres. Although the preferred embodiment has been described as including three spray applicators 60 which cooperate with one another to permit a wide variety of colors to be selected (by controlling the proportion in which the colors from the three applicators are mixed), it is to be under-stood that the machine can be provided with virtually any desired number of liquid applicators, and they may operate singly rather than together. Likewise, although only a single icing or gel dispenser tube 98 is included in the preferred embodiment of the invention, a different number of dispensers of semi-solid decorative materials may be provided.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Apparatus for applying flowable decorative food material to a food article such as a cake, said apparatus comprising:
   a frame;
   means on said frame for holding the food article;
   an applicator on the frame in proximity to the food article on said holding means for applying the decorative food material thereto;
   means for mounting said applicator and holding means on the frame for movement relative to one another in a manner allowing the applicator to traverse a surface of the food article which is to be decorated;
   a video monitor;
   means for displaying on said monitor an image which is to be reproduced on said surface of the food article; and
   means for effecting relative movement between said applicator and holding means while at the same time controlling application of the decorative food material from said applicator in a pattern that is effective to substantially reproduce said image on said surface on the food article.

2. Apparatus as set forth in claim 1, wherein said means for effecting relative movement comprises:
   means for digitizing the image on the monitor and assigning to each pixel in the digitized image a numerical value determined by the content of the pixel;
   means for moving the applicator among pixels arranged in mutually perpendicular rows and columns and corresponding to the pixels of the digitized image; and means for dispensing the decorative food material from said applicator to each pixel in an amount determined by the numerical value assigned to the corresponding pixel in the digitized image.

3. Apparatus as set forth in claim 2, wherein said means for moving the applicator comprises:
- a first table mounted on the frame for linear movement along a first axis;
- a second table mounted on said first table for linear movement relative thereto along a second axis oriented perpendicular to said first axis, said first and second axes being oriented parallel to the rows and columns in which said pixels are arranged; and
- drive means for advancing each table in incremental steps each carrying the applicator from one pixel to an adjacent pixel in the same row or column.

4. Apparatus as set forth in claim 2, wherein said applicator comprises a plurality of separate applicator elements each holding a quantity of decorative food material having a different color than the food material held by the other applicator elements and each having a discharge nozzle adjacent the nozzles of the other applicator elements, whereby the colors in the different applicator elements can be mixed in selected quantities to vary the color of the decorative food material applied to each pixel.

5. Apparatus as set forth in claim 1, wherein:
- said decorative food material includes semi-solid material and liquid;
- said applicator comprises at least one applicator element for holding and applying the liquid and at least one dispenser element for holding and applying the semi-solid material; and
- said mounting means is arranged to locate said applicator element and said dispenser element in proximity to one another.

6. Apparatus as set forth in claim 1, wherein:
- said decorative food material includes semi-solid material and liquid;
- said applicator comprises a plurality of applicator elements each holding liquid of a different color and at least one dispenser elements for holding and applying the semi-solid materials; and
- said mounting means is arranged with said applicator elements aimed at the same location to permit mixing of the liquids in the applicator elements in different amounts to vary the color of the liquid applied to the article.

7. Apparatus as set forth in claim 1, wherein said displaying means comprises a video camera operable to capture a live video image and display the live image on the monitor.

8. Apparatus as set forth in claim 7, wherein said displaying means further comprises means for storing previously recorded images and means for retrieving the stored images and displaying them on the monitor.

9. Apparatus as set forth in claim 8, wherein said displaying means further comprises means for displaying contemporaneously prepared drawings.

10. Apparatus as set forth in claim 7, wherein said displaying means comprises means for displaying alpha-numeric characters in a selected arrangement to display a written message on the monitor.

11. Apparatus as set forth in claim 1, wherein said displaying means comprises means for storing previously recorded images and means for retrieving the stored images and displaying them on the monitor.

12. Apparatus as set forth in claim 1, including means for editing the content of the image displayed on the monitor.

13. Apparatus as set forth in claim 1, wherein said displaying means further comprises means for displaying contemporaneously prepared drawings.

14. Apparatus for applying semi-solid and liquid decorative food materials to a food article such as a cake, said apparatus comprising:
- a frame having means for receiving and holding the food article;
- at least one applicator for holding a quantity of the liquid decorative material and applying same to the food article when the applicator is activated;
- at least one dispenser for holding a quantity of the semi-solid decorative material and dispensing same onto the food article when the dispenser is activated;
- means for mounting said applicator and dispenser on the frame in a manner permitting movement thereof along substantially the entirety of a surface of the food article which is to be decorated;
- a video monitor;
- means for displaying on said monitor different images in succession; and
- means for controlling the movement and activation of said applicator and dispenser in a manner to apply the liquid and semi-solid decorative food materials to said surface of the food article in a pattern to substantially reproduce thereon any selected image displayed on the monitor.

15. Apparatus as set forth in claim 14, wherein said displaying means comprises a video camera for capturing a live video image, means for storing the captured image and means for retrieving the stored image and displaying same on the monitor.

16. Apparatus as set forth in claim 15, wherein said displaying means further comprises means for displaying contemporaneously prepared drawings on the monitor.

17. Apparatus as set forth in claim 15, wherein said displaying means further comprises means for displaying previously recorded artwork on the monitor.

18. Apparatus as set forth in claim 15, wherein said displaying means further comprises means for displaying alpha-numeric characters in a selected arrangement to display a written message on the monitor.

* * * * *